Figure 1:
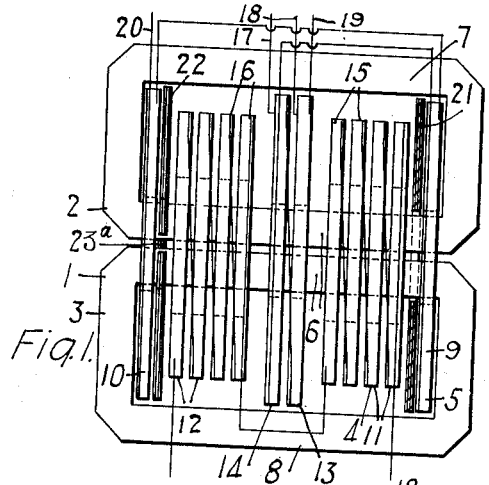

J. F. PETERS.
TRANSFORMER FOR USE WITH ROTARY CONVERTERS.
APPLICATION FILED APR. 29, 1915.

1,347,910.

Patented July 27, 1920.

WITNESSES:

INVENTOR
John F. Peters.
BY
ATTORNEY

UNITED STATES PATENT OFFICE.

JOHN F. PETERS, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

TRANSFORMER FOR USE WITH ROTARY CONVERTERS.

1,347,910.  Specification of Letters Patent.  Patented July 27, 1920.

Application filed April 29, 1915. Serial No. 24,742.

*To all whom it may concern:*

Be it known that I, JOHN F. PETERS, a citizen of the United States, and a resident of Edgewood Park, in the county of Allegheny and State of Pennsylvania, have invented a new and useful Improvement in Transformers for Use with Rotary Converters, of which the following is a specification.

My invention relates to transformers and it has special reference to power transformers which embody circuits or windings of both high and low reactance.

More particularly, my invention relates to transformers that may be employed to furnish power to rotary converters.

Transformers constructed in accordance with my invention provide low-reactance windings or circuits for connection to the alternating-current sides of rotary converters during the starting operation, and high-reactance windings or circuits for connection thereto after the rotary converters have been brought up to speed.

It is usual to connect the alternating-current side of a rotary converter to low-voltage taps on the low-tension side of a transformer during the starting operation. After the rotary converter is brought up to speed, suitable switching means are provided to switch the alternating-current side of the rotary to the running taps upon the low-tension side of the transformer.

Since it is important to provide a high-reactance circuit for connection to a rotary converter during normal operation for "compounding" the same, transformers are so designed as to have high internal reactance, thereby providing for the automatic compounding of the rotary converter. This practice is old in the art, and is in common commercial use. A transformer of this character is provided with a high artificial internal reactance which manifests itself in all the circuits embodying the windings of the transformer. Consequently, when a rotary converter is connected to taps on the low-tension sides of such transformers, during the starting operation, the currents drawn from the power-supply mains are unusually high. Under any circumstances, a rotary converter starting on voltages considerably below normal, draws currents of relatively low power factors from the supply mains. Therefore, when a rotary converter is connected to taps on the low-tension side of a transformer of the above-mentioned character, the currents drawn from the supply mains have extremely low power factors. Moreover, the starting currents are of abnormally high values, probably two to three times greater than normal. As a result, the power system is called upon to supply abnormally high currents of extremely low power factors.

By means of my present invention, I provide a transformer whereby the power factors of the starting currents for a rotary converter are considerably increased. At the same time, the rotary converter, under normal operating conditions, is connected to a high-reactance circuit, whereby the "compounding" function on the rotary may be performed without employing reactance coils, etc.

Figure 4:
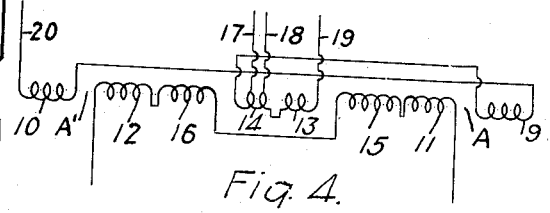
Figure 2:
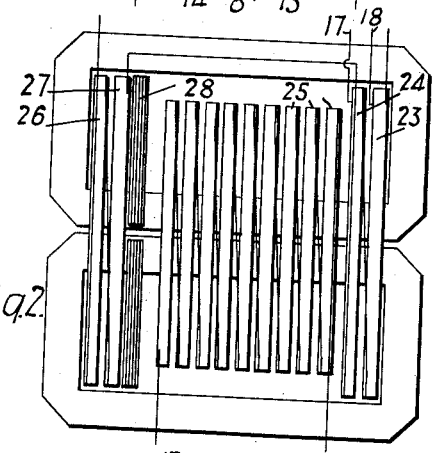
Figure 5:
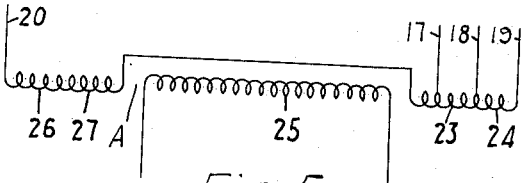
Figure 3:
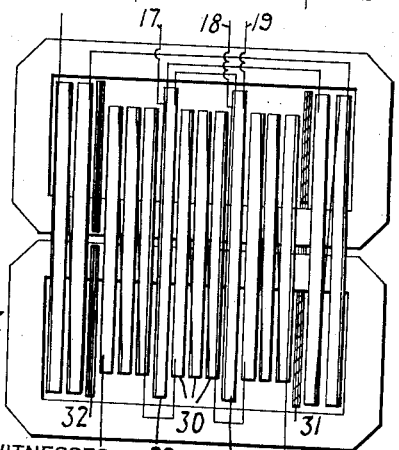
Figure 6:
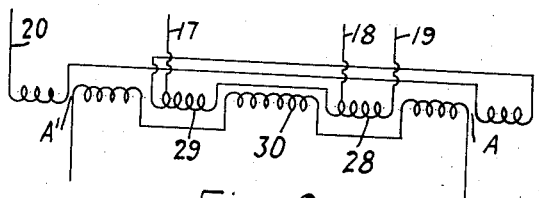

For a better understanding of the nature and scope of my invention, reference may be had to the following description and the accompanying drawing in which Figure 1 is a top view, partially in section and somewhat diagrammatic, of a transformer embodying a form of my invention; Figs. 2 and 3 are modifications of the transformer shown in Fig. 1; Fig. 4 is a wiring diagram of the connections between the various coils comprising the transformer shown in Fig. 1, and Figs. 5 and 6 are wiring diagrams of the transformers shown in Figs. 2 and 3, respectively.

Referring to Fig. 1, a magnetizable core member 1, comprising sections 2 and 3, is provided with high-tension coils 4 and low-tension coils 5 which embrace centrally-disposed legs 6 of the core member. Outer legs 7 and 8 inclose the outer edges of the coils, thereby forming a shell-type construction, such as is well known in the art.

It will be noted that the high-tension coils 4 and the low-tension coils 5 are alternately disposed to form a plurality of coil-groups, each comprising high-tension and low-tension coils disposed adjacent to one another. In Fig. 1, I have shown four such coil-groups, two coil groups comprising outermost low-tension coils 9 and 10 and two co-operating pairs of high-tension coils 11 and 12, disposed immediately adjacent thereto, and two coil-groups comprising centrally-disposed low-tension coils 13 and 14 and two coöperating pairs of high-tension coils 15 and 16 disposed immediately adjacent thereto. The centrally-disposed low-tension coils 13 and 14 are connected in series relationship, and are provided with taps 17 and 18, one of the terminals of said coils being represented at 19. The coils 13 and 14 are likewise connected in series relationship with the low-tension coils 9 and 10, the other terminal of the secondary winding being represented at 20. Magnetizable members 21 and 22 are inserted between the low-tension coil 9 and the high-tension coils 11 comprising one coil-group, and between the low-tension coil 10 and the high-tension coils 12 comprising another coil group. It will be noted that the low-tension coils 9 and 10 are devoid of taps, the only connections made to them being made through their terminals. The magnetizable core members 21 and 22 are preferably provided with air gaps 23ᵃ which give a straight-line characteristic to the transformer and, consequently, satisfactory regulation up to the maximum load for which the transformer is designed.

In Fig. 4, it may be clearly seen that the magnetic shunts 21 and 22 are inserted at A and A', between the coils 11 and 9 and the coils 12 and 10. The coils 16 and 14, and the coils 13 and 15 are closely magnetically linked so as to minimize the magnetic leakage between them. As a result, the reactance of the low-tension coils 13 and 14 is extremely low, and, for this reason, the starting taps 17 and 18 are provided in order that the rotary converter may be connected thereto during the starting operation. As mentioned above, when the rotary converter is brought up to speed, the alternating-current side is connected across the terminals 19 and 20, thereby providing a high-reactance circuit which automatically performs the compounding function in connection with the rotary converter. While I have described the above operation as related to a rotary converter, it will be understood that the diagram shown in Fig. 4 is useful in supplying power to one phase only of a rotary converter, similar connections being provided for the other phases. Since the diagram of Fig. 4 is sufficient in explaining the operation of my transformer, it is not deemed necessary to show a plurality of such connections in order to furnish power to a polyphase rotary converter.

In Fig. 2, I have shown diagrammatically a transformer comprising low-tension coils 23 and 24 which are closely magnetically linked with high-tension coils 25. The coils 25 are placed intermediate said low-tension coils 23 and 24 and low-tension coils 26 and 27, the latter of which are separated from the high-tension coils 25 by means of a magnetic shunt 28. The taps 17 and 18 are provided on the low-tension coils 23 and 24, respectively. As explained in connection with Figs. 1 and 4, the low-tension coils are all connected in series relationship with one another, and the high-tension coils 25 are similarly connected. By referring to Fig. 5, it will be seen that one phase of the rotary converter is to be connected across the terminals 19 and to either one of the starting taps 17 and 18 during the starting operation. Inasmuch as the magnetic shunt 28 is disposed at A, the reactance of the starting circuit is very small, inasmuch as the low-tension coils 23 and 24 are closely inductively related to the primary coils 25, as previously explained. After the rotary converter has been brought to speed, switching means are provided whereby the rotary converter may be furnished power from the terminals 19 and 20. In this position, the alternating-current side of the rotary converter is connected to a high-reactance circuit by reason of the magnetic shunt 28 being interposed between a coil group comprising the low-tension coils 26 and 27 and those high-tension coils 25 which are immediately adjacent thereto.

When it is desired to start a rotary converter from a circuit, having an extremely low reactance, the transformer coils and magnetic shunts may be arranged as shown in Figs. 3 and 6. In this instance, six coil-groups comprising adjacently-disposed high and low-tension coils are provided. A low-tension coil 28 is provided with the terminal 19 and the tap 18, and is connected in series relationship with a second low-tension coil 29 that is provided with the tap 17. It is apparent that the secondary coils 28 and 29 are separated from each other and interlaced with primary coils 30 in order to secure a very low reactance. In this case, one phase of the rotary converter is connected to the terminal 19 and to either one of the taps 17 or 18 for the starting operation. As mentioned above, the low-tension coils 28 and 29 comprise a circuit of extremely low-reactance and are, therefore, adapted to supply power to a rotary converter of an extremely high capacity. Magnetic shunts 31 and 32 are interposed between the high and low-tension coils comprising two coil-groups and may be represented as being disposed at A and A', respectively, of Fig. 6. When the rotary converter is running at full speed and is supplied with power furnished from all the secondary windings connected in series relationship, a high-reactance circuit is provided whereby the compounding of the rotary converter may be effectively performed.

It is usual to provide transformers with flat pancake coils, the primary coils and secondary coils being alternately disposed or "sandwiched" according to the conditions under which the transformers are to operate. Transformers of this character readily lend themselves for providing high and low-reactance circuits such as I embody in the transformer of the present invention. The magnetic shunts interposed between the coils of the coil groups may be placed without any undue inconvenience in assembling the transformer.

While I have used the terms high-tension and low-tension to designate the coils in describing the performance of my transformer, it will be understood that such terms are used in lieu of the terms "primary" and "secondary," and that they are not intended to limit my invention to transformers of any specific type or kind as regards kind or ratio of transformation.

I claim as my invention:

1. In a transformer, a core member, groups of sectioned high and low-tension coils inductively related thereto, means associated with at least one of said groups for increasing the reactance thereof, and means for connecting only those groups in circuit which are free from the reactance-increasing means during one period of operation and for connecting all of the coil groups in circuit during another period of operation.

2. In a transformer, a core member, groups of sectioned high and low-tension coils inductively related thereto, reactance-increasing means associated with at least one of said coil groups, and means whereby said transformer functions, at times, as a low-reactance device, and, at other times as a high-reactance device.

3. In a transformer, a core member, groups of sectioned high and low-tension coils inductively related thereto, means associated with at least one of said groups for increasing the reactance thereof, and two sets of connections extending from the low-tension coil group, one set of the connections serving to connect only those coil sections having a low reactance to a consumption device, and the other set of connections serving to connect all the low-tension sections, including those having high reactance, to the consumption device, whereby the transformer constitutes a low-reactance device during one period of operation and a high-reactance device during another period of operation.

4. In a transformer, a core member, groups of sectioned high and low-tension coils inductively related thereto, means associated with at least one coil group for increasing the reactance thereof, and connecting means extending from the sections of the low-tension coil whereby those low-tension sections having a low reactance may be used during one period of operation and whereby all the low-tension sections, including those having high reactance, may be employed during another period of operation.

5. In a transformer, a core member, groups of sectioned high and low-tension coils inductively related thereto, magnetic means interposed between the high and low-tension sections of at least one coil group to increase the reactance thereof, the low-tension sections being provided with taps whereby those sections having a low reactance may be utilized during one period of operation, and all of the sections including the high-reactance sections may be utilized during another operating period.

In testimony whereof, I have hereunto subscribed my name this 24th day of April, 1915.

JOHN F. PETERS.